US010674864B2

(12) United States Patent
Trtic (10) Patent No.: US 10,674,864 B2
(45) Date of Patent: Jun. 9, 2020

(54) COOKING DEVICE FOR IMPROVED HEATING

(71) Applicant: Slavisa Trtic, Portland, OR (US)

(72) Inventor: Slavisa Trtic, Portland, OR (US)

( * ) Notice: Subject to any disclaimer, the term of this patent is extended or adjusted under 35 U.S.C. 154(b) by 322 days.

(21) Appl. No.: 15/650,657

(22) Filed: Jul. 14, 2017

(65) Prior Publication Data
US 2019/0014941 A1  Jan. 17, 2019

(51) Int. Cl.
| | |
|---|---|
| *A47J 31/46* | (2006.01) |
| *A47J 27/04* | (2006.01) |
| *A47J 31/54* | (2006.01) |
| *A47J 36/24* | (2006.01) |
| *A47J 43/18* | (2006.01) |
| *A47J 37/06* | (2006.01) |
| *A47J 36/04* | (2006.01) |
| *A47J 27/00* | (2006.01) |

(52) U.S. Cl.
CPC ............. *A47J 31/46* (2013.01); *A47J 27/04* (2013.01); *A47J 31/54* (2013.01); *A47J 36/04* (2013.01); *A47J 36/24* (2013.01); *A47J 37/0664* (2013.01); *A47J 43/18* (2013.01); *A47J 27/00* (2013.01); *A47J 2027/043* (2013.01)

(58) Field of Classification Search
CPC .................................................. A47J 27/002; A47J 36/06; A47J 36/20; A47J 36/38; A47J 2027/046; A47J 31/54; A47J 36/04; A47J 36/24; A47J 37/0664; A47J 27/00
USPC .......... 99/532, 345, 352, 332, 483, 426, 330
See application file for complete search history.

(56) References Cited

U.S. PATENT DOCUMENTS

| | | | | |
|---|---|---|---|---|
| 92,194 | A * | 7/1869 | Kaiser ....................... | F16N 3/08 222/385 |
| 390,591 | A * | 10/1888 | Haberman .............. | B29C 45/36 222/573 |
| 598,126 | A * | 2/1898 | Whitney et al. ....... | A01G 25/14 239/377 |
| 826,216 | A * | 7/1906 | Asbury .............. | A22C 11/0209 452/45 |
| 849,290 | A * | 4/1907 | Vanderbilt .......... | A47J 37/0694 99/426 |
| 880,522 | A * | 3/1908 | Gray ..................... | A47J 45/071 220/759 |
| 1,339,625 | A * | 5/1920 | Holloway ............. | A47J 37/106 99/346 |
| D56,774 | S * | 12/1920 | Sroka .......................... | D23/212 |
| 1,393,762 | A * | 10/1921 | Demuth .................. | A47J 27/17 99/347 |
| 1,485,253 | A * | 2/1924 | Devlin .................... | A47J 37/00 99/419 |

(Continued)

OTHER PUBLICATIONS

"Slipcasting," Wikipedia Website, Available Online at https://en.wikipedia.org/w/index.php?title=Slipcasting&oldid=742596995, As Last Updated Oct. 4, 2016, Website Available As Early as Dec. 15, 2005, 2 pages.

(Continued)

Primary Examiner — Jimmy Chou
(74) Attorney, Agent, or Firm — McCoy Russell LLP (57) ABSTRACT

Methods and systems are provided for a cooking device which provides even heat to a food item both inside and out. In one example, a system may include a ceramic cooking device comprising a body coupled to a tubular neck which functions as a heat absorber and refilling device.

15 Claims, 9 Drawing Sheets

(56) References Cited

U.S. PATENT DOCUMENTS

| | | | | |
|---|---|---|---|---|
| 1,699,459 A * | 1/1929 | Ullrich | A01G 25/14 | 239/377 |
| 1,702,523 A * | 2/1929 | Schafer | A01G 25/14 | 239/377 |
| 2,212,477 A * | 8/1940 | Mayer | A61M 5/32 | 99/532 |
| 2,372,466 A * | 3/1945 | Zvolanek | A01G 25/14 | 239/516 |
| 2,424,583 A * | 7/1947 | Rahm | A47G 19/14 | 215/12.2 |
| D158,914 S * | 6/1950 | Tompkins | D23/212 | |
| D175,084 S * | 7/1955 | Locke et al. | D23/212 | |
| D177,437 S * | 4/1956 | Schreckengost | D7/322 | |
| 2,821,904 A * | 2/1958 | Domenico Arcabosso | A47J 37/106 | 99/346 |
| 2,835,480 A * | 5/1958 | Perez | A47J 37/04 | 165/104.21 |
| 2,965,310 A * | 12/1960 | Gettelman | A01G 25/14 | 239/391 |
| 3,215,171 A * | 11/1965 | Mitchell | B01L 3/0282 | 141/24 |
| 3,392,665 A * | 7/1968 | Harnest | A47J 37/0694 | 99/426 |
| 3,511,164 A * | 5/1970 | Peckenpaugh | A23L 13/72 | 99/532 |
| D217,789 S * | 6/1970 | Oddo | D19/85 | |
| 3,635,146 A * | 1/1972 | Aubert | A47J 37/0864 | 99/339 |
| 3,713,378 A * | 1/1973 | West | A47J 37/106 | 99/346 |
| 3,777,094 A * | 12/1973 | Peters, Jr. | A47J 36/04 | 219/621 |
| 3,830,191 A * | 8/1974 | Burke | G01K 11/04 | 116/67 R |
| 3,858,029 A * | 12/1974 | Walter | A45D 4/00 | 219/222 |
| 3,908,532 A * | 9/1975 | Underwood | A47J 37/106 | 99/347 |
| 4,027,583 A * | 6/1977 | Spanek | A47J 43/18 | 99/421 H |
| 4,127,060 A * | 11/1978 | Curtis | A47J 37/00 | 99/419 |
| 4,129,066 A * | 12/1978 | Corley | A47J 37/00 | 99/345 |
| D266,018 S * | 8/1982 | Dilyard | D23/212 | |
| 4,407,189 A * | 10/1983 | Bentson | A47J 37/0694 | 211/198 |
| 4,421,017 A * | 12/1983 | Ross | A47J 37/049 | 99/421 H |
| 4,450,759 A * | 5/1984 | Steibel | A47J 37/0694 | 211/189 |
| D279,310 S * | 6/1985 | Murphy | D23/212 | |
| 4,557,188 A * | 12/1985 | Spanek | A47J 43/18 | 211/181.1 |
| 4,558,197 A * | 12/1985 | Wyatt | H05B 6/6408 | 219/732 |
| 4,633,773 A * | 1/1987 | Jay | A47J 43/18 | 211/181.1 |
| 4,700,892 A * | 10/1987 | Cunning | A01G 25/145 | 222/189.11 |
| 4,709,626 A * | 12/1987 | Hamlyn | A47J 43/18 | 99/345 |
| D295,547 S * | 5/1988 | Cunning | D23/212 | |
| 4,762,056 A * | 8/1988 | Virag | A47J 27/00 | 426/394 |
| 4,924,768 A * | 5/1990 | Jay | A47J 37/0694 | 211/125 |
| D316,007 S * | 4/1991 | Wagner | D7/366 | |
| 5,025,715 A * | 6/1991 | Sir | A47J 33/00 | 126/30 |
| D320,526 S * | 10/1991 | Unger | D7/321 | |
| 5,069,117 A * | 12/1991 | Schlessel | A47J 43/18 | 99/419 |
| 5,081,916 A * | 1/1992 | Kuhling | A47J 37/00 | 99/345 |
| 5,106,642 A * | 4/1992 | Ciofalo | A23L 13/50 | 211/85.4 |
| D334,686 S * | 4/1993 | Wiley | D7/312 | |
| 5,297,477 A * | 3/1994 | Phillips | A47J 43/14 | 434/81 |
| 5,301,602 A * | 4/1994 | Ryczek | A47J 43/18 | 99/345 |
| D355,563 S * | 2/1995 | Lebowitz | D7/321 | |
| D357,729 S * | 4/1995 | Boyd | D23/200 | |
| 5,434,390 A * | 7/1995 | McKee | A21B 1/245 | 126/21 A |
| 5,442,999 A * | 8/1995 | Meister | A47F 3/001 | 99/419 |
| 5,575,198 A * | 11/1996 | Lowery | A47J 43/18 | 99/426 |
| 5,586,489 A * | 12/1996 | Fraga | A47J 37/049 | 99/419 |
| 5,638,742 A * | 6/1997 | Kassaseya | A47J 43/18 | 211/181.1 |
| D380,336 S * | 7/1997 | Zive | D7/312 | |
| 5,662,028 A * | 9/1997 | Fraga | A47J 37/049 | 99/419 |
| 5,730,046 A * | 3/1998 | Battaglia | A47J 43/18 | 426/523 |
| 5,787,799 A * | 8/1998 | Mohrhauser | A47J 37/106 | 222/215 |
| 5,791,235 A * | 8/1998 | Anselmo | A47J 43/18 | 211/181.1 |
| 5,842,409 A * | 12/1998 | Loffler | A47J 43/18 | 99/421 V |
| 5,893,320 A * | 4/1999 | Demaree | A47J 43/18 | 219/725 |
| 5,913,965 A * | 6/1999 | Gargano | A47J 37/106 | 99/346 |
| D412,297 S * | 7/1999 | Roach | D11/152 | |
| 5,975,073 A * | 11/1999 | Kuo | A47J 37/0623 | 126/275 R |
| 5,981,926 A * | 11/1999 | Kim | A47J 43/18 | 219/732 |
| 6,016,744 A * | 1/2000 | Pritsker | A22C 21/0038 | 426/132 |
| 6,026,734 A * | 2/2000 | Dadez | A47J 37/106 | 99/345 |
| 6,039,373 A * | 3/2000 | Horn | A47J 43/18 | 294/15 |
| 6,062,131 A * | 5/2000 | Holland | A47J 43/18 | 99/345 |
| 6,119,585 A * | 9/2000 | Guidry | A47J 43/18 | 99/345 |
| 6,125,739 A * | 10/2000 | Jernigan | A47J 43/18 | 99/345 |
| 6,192,792 B1 * | 2/2001 | Gremillion | A47J 43/18 | 99/347 |
| 6,216,586 B1 * | 4/2001 | Burgin | A47J 43/18 | 99/339 |
| 6,265,004 B1 * | 7/2001 | Cagle | A22B 5/0094 | 426/129 |
| 6,272,976 B1 * | 8/2001 | Berryman | A47J 27/04 | 99/340 |
| 6,302,336 B1 * | 10/2001 | Brown | A01G 25/14 | 239/302 |
| 6,314,869 B1 * | 11/2001 | Bourgeois, Jr. | A47J 33/00 | 99/340 |
| D453,488 S * | 2/2002 | McCauley | D11/152 | |
| 6,349,632 B1 * | 2/2002 | Beck, Jr. | A47J 37/049 | 99/345 |
| D459,431 S * | 6/2002 | Rosenberg | D23/212 | |
| 6,416,804 B1 * | 7/2002 | Sherwin | A47J 36/00 | 426/282 |
| D461,682 S * | 8/2002 | Fandrey | D7/323 | |
| 6,427,582 B1 * | 8/2002 | Measom | A47J 27/00 | 99/342 |

(56) References Cited

U.S. PATENT DOCUMENTS

| | | | | |
|---|---|---|---|---|
| 6,446,546 B1* | 9/2002 | Hodson | A23B 4/20 | |
| | | | 220/573.1 | |
| 6,460,452 B1* | 10/2002 | Hester | A47J 37/049 | |
| | | | 99/347 | |
| 6,467,399 B1* | 10/2002 | Boutte | A47J 43/18 | |
| | | | 99/347 | |
| 6,487,964 B2* | 12/2002 | Snoke | A47J 37/01 | |
| | | | 99/345 | |
| 6,502,501 B1* | 1/2003 | Simon | A47J 27/04 | |
| | | | 99/345 | |
| 6,502,503 B1* | 1/2003 | Bell, Jr. | A47J 36/16 | |
| | | | 99/345 | |
| 6,503,551 B1* | 1/2003 | Hester | A47J 37/049 | |
| | | | 426/523 | |
| 6,553,896 B1* | 4/2003 | Heide | A47J 43/18 | |
| | | | 99/347 | |
| 6,557,461 B2* | 5/2003 | Sherwin | A47J 36/00 | |
| | | | 99/345 | |
| 6,575,204 B1* | 6/2003 | Godfrey | A47J 37/106 | |
| | | | 141/1 | |
| D486,989 S * | 2/2004 | Bodum | D7/312 | |
| 6,692,783 B2* | 2/2004 | Hunter | A23B 4/00 | |
| | | | 426/281 | |
| D488,741 S * | 4/2004 | Moya | D11/143 | |
| 6,725,764 B2* | 4/2004 | Sherwin | A47J 43/18 | |
| | | | 99/345 | |
| D495,193 S * | 8/2004 | Moore | D7/312 | |
| 6,779,438 B1* | 8/2004 | Citrynell | A47J 43/18 | |
| | | | 426/510 | |
| D505,827 S * | 6/2005 | Riddle, III | D7/360 | |
| D506,352 S * | 6/2005 | Dow | D7/361 | |
| 6,945,161 B1* | 9/2005 | Battaglia | A47J 37/0694 | |
| | | | 211/181.1 | |
| D513,930 S * | 1/2006 | Novi | D7/409 | |
| 7,040,219 B1* | 5/2006 | D'Amato | A47J 43/18 | |
| | | | 211/181.1 | |
| D522,807 S * | 6/2006 | Dow | D7/361 | |
| 7,066,358 B2* | 6/2006 | Monsalve | A01G 25/14 | |
| | | | 222/158 | |
| D525,340 S * | 7/2006 | Durant | D23/212 | |
| D525,471 S * | 7/2006 | Measom | D7/323 | |
| D526,830 S * | 8/2006 | Goulart | D7/312 | |
| D541,574 S * | 5/2007 | Henderson | D7/312 | |
| D547,603 S * | 7/2007 | Passman | D7/355 | |
| D548,003 S * | 8/2007 | Barth | A47J 43/18 | |
| | | | D7/387 | |
| D552,404 S * | 10/2007 | Bodum | D7/312 | |
| D557,071 S * | 12/2007 | Zemel | D7/323 | |
| D558,510 S * | 1/2008 | Bodum | D7/312 | |
| D558,519 S * | 1/2008 | Zemel | D7/409 | |
| D560,091 S * | 1/2008 | Bodum | D7/312 | |
| 7,320,275 B2* | 1/2008 | Jenkins | A23B 4/00 | |
| | | | 99/345 | |
| D560,967 S * | 2/2008 | Zemel | D7/409 | |
| D564,286 S * | 3/2008 | Zemel | D7/354 | |
| D572,970 S * | 7/2008 | Barth | D7/387 | |
| D573,838 S * | 7/2008 | Jones | D7/409 | |
| D576,837 S * | 9/2008 | Le Vavasseure | D7/378 | |
| D589,292 S * | 3/2009 | Thurlow | D7/312 | |
| D591,105 S * | 4/2009 | Hodges | D7/409 | |
| 7,549,369 B2* | 6/2009 | Zimmerman | A47J 37/06 | |
| | | | 222/146.5 | |
| 7,565,863 B2* | 7/2009 | Tschetter | A47J 37/0694 | |
| | | | 99/419 | |
| 7,879,381 B2* | 2/2011 | Dow | A47J 36/00 | |
| | | | 426/523 | |
| 7,946,221 B2* | 5/2011 | Hull, Jr. | A47J 37/106 | |
| | | | 99/346 | |
| D639,186 S * | 6/2011 | Shapiro | D9/711 | |
| D639,601 S * | 6/2011 | Borovicka | D7/354 | |
| D639,656 S * | 6/2011 | Shapiro | D9/435 | |
| 8,110,237 B2* | 2/2012 | Smith | A47J 43/18 | |
| | | | 426/241 | |
| D657,612 S * | 4/2012 | Cloutier | D7/354 | |
| D671,355 S * | 11/2012 | Zmrhal | D7/354 | |
| D675,474 S * | 2/2013 | de Klein | D7/320 | |
| 8,397,630 B2* | 3/2013 | Oswald | A47J 27/04 | |
| | | | 99/346 | |
| 8,438,970 B2* | 5/2013 | Rayment | A47J 37/106 | |
| | | | 99/345 | |
| D689,245 S * | 9/2013 | Rowe | D30/132 | |
| 8,539,877 B2* | 9/2013 | Levy | A23L 5/13 | |
| | | | 426/509 | |
| D694,477 S * | 11/2013 | Rowe | D30/132 | |
| 8,621,988 B1* | 1/2014 | O'Dea | A47J 43/18 | |
| | | | 211/181.1 | |
| D700,004 S * | 2/2014 | Weskamp | D7/354 | |
| 8,813,636 B2* | 8/2014 | Oswald | A47J 27/04 | |
| | | | 99/345 | |
| 8,850,965 B2* | 10/2014 | Popeil | A47J 37/1219 | |
| | | | 426/438 | |
| D727,678 S * | 4/2015 | Minor | D7/354 | |
| D737,103 S * | 8/2015 | Cloutier | D7/554.2 | |
| D738,579 S * | 9/2015 | Owens | D30/132 | |
| D740,392 S * | 10/2015 | Moore | D23/212 | |
| D741,451 S * | 10/2015 | Moore | D23/212 | |
| 9,155,423 B2* | 10/2015 | Malone | A47J 43/18 | |
| 9,179,803 B1* | 11/2015 | Benelli | A47J 36/2494 | |
| D810,497 S * | 2/2018 | Costa Llonch | D7/359 | |
| D818,760 S * | 5/2018 | Abbo | D7/354 | |
| 10,015,975 B2* | 7/2018 | Parrish | A23B 4/0523 | |
| D825,977 S * | 8/2018 | Maffei, Jr. | D7/354 | |
| 10,258,192 B1* | 4/2019 | Cloutier | A47J 36/16 | |
| 10,299,446 B2* | 5/2019 | Zimmer | A01G 25/14 | |
| 10,299,621 B1* | 5/2019 | Bourgeois | A47J 37/049 | |
| 10,314,431 B2* | 6/2019 | Choy | A47J 36/38 | |
| 2002/0100371 A1* | 8/2002 | Snoke | A47J 37/01 | |
| | | | 99/419 | |
| 2002/0178928 A1* | 12/2002 | Hunter | A23B 4/00 | |
| | | | 99/419 | |
| 2002/0195001 A1* | 12/2002 | Hester | A47J 37/049 | |
| | | | 99/345 | |
| 2003/0019862 A1* | 1/2003 | Sherwin | A47J 36/00 | |
| | | | 219/400 | |
| 2003/0056656 A1* | 3/2003 | Marco, Jr. | A47J 37/106 | |
| | | | 99/345 | |
| 2004/0003725 A1* | 1/2004 | Sherwin | A47J 43/18 | |
| | | | 99/419 | |
| 2004/0011223 A1* | 1/2004 | Odom, Jr. | A23P 10/10 | |
| | | | 99/494 | |
| 2004/0149146 A1* | 8/2004 | Jenkins | A23B 4/00 | |
| | | | 99/494 | |
| 2004/0187699 A1* | 9/2004 | Citrynell | A47J 43/18 | |
| | | | 99/345 | |
| 2005/0172823 A1* | 8/2005 | Riddle, III | A47J 43/18 | |
| | | | 99/345 | |
| 2005/0257693 A1* | 11/2005 | Tschetter | A47J 37/0694 | |
| | | | 99/419 | |
| 2005/0257694 A1* | 11/2005 | Afif | A23P 30/10 | |
| | | | 99/426 | |
| 2006/0057267 A1* | 3/2006 | Dow | A47J 36/00 | |
| | | | 426/524 | |
| 2006/0068067 A1* | 3/2006 | Zimmerman | A47J 37/06 | |
| | | | 426/281 | |
| 2006/0219101 A1* | 10/2006 | McIlwee | A47J 43/18 | |
| | | | 99/419 | |
| 2006/0266227 A1* | 11/2006 | Britt | A47J 43/18 | |
| | | | 99/426 | |
| 2006/0283335 A1* | 12/2006 | Vasquez | A47J 37/1295 | |
| | | | 99/403 | |
| 2007/0181006 A1* | 8/2007 | Measom | A47J 37/01 | |
| | | | 99/345 | |
| 2008/0044536 A1 | 2/2008 | Barth | | |
| 2008/0202631 A1* | 8/2008 | Loewenthal | A47J 37/106 | |
| | | | 141/26 | |
| 2009/0087535 A1* | 4/2009 | Smith | A47J 43/18 | |
| | | | 426/523 | |
| 2010/0018413 A1* | 1/2010 | Thomas | A47J 37/043 | |
| | | | 99/421 HV | |

(56) References Cited

U.S. PATENT DOCUMENTS

| | | | |
|---|---|---|---|
| 2010/0059605 A1* | 3/2010 | Plantz | B01F 5/0413 239/316 |
| 2011/0042487 A1* | 2/2011 | Cai | A01G 25/145 239/332 |
| 2011/0061746 A1* | 3/2011 | Cai | B05B 9/085 137/197 |
| 2011/0209627 A1* | 9/2011 | Wong | A47J 43/18 99/419 |
| 2011/0226135 A1* | 9/2011 | Oswald | A47J 27/04 99/419 |
| 2011/0315788 A1* | 12/2011 | Henderson | A01M 7/0046 239/152 |
| 2012/0048126 A1* | 3/2012 | Tweed | A47J 43/16 99/494 |
| 2012/0103199 A1* | 5/2012 | Kaufman | A47J 29/02 99/426 |
| 2012/0167778 A1* | 7/2012 | Popeil | A47J 37/1209 99/339 |
| 2012/0174799 A1* | 7/2012 | Borovicka | A47J 37/0694 99/347 |
| 2012/0315363 A1* | 12/2012 | Suarez_Mason | A47J 27/04 426/510 |
| 2013/0112087 A1* | 5/2013 | Hassell | A47J 37/108 99/421 H |
| 2013/0216691 A1* | 8/2013 | Sudmalis | A47J 43/18 426/644 |
| 2014/0259352 A1* | 9/2014 | Jones | E03D 9/085 4/443 |
| 2016/0165942 A1* | 6/2016 | Esposito | A23L 13/55 426/281 |

OTHER PUBLICATIONS

"Per Capita Consumption of Poultry and Livestock, 1965 to Estimated 2017, in Pounds," National Chicken Council, Available Online at http://www.nationalchickencouncil.org/about-the-industry/statistics/per-capita-consumption-of-poultry-and-livestock-1965-to-estimated-2012-in-pounds/, Available as Early as Mar. 14, 2012, 3 pages.

Lyles, T. et al., "Thanksgiving by the numbers," CNN, Available Online at http://www.cnn.com/2012/11/21/living/thanksgiving-by-the-numbers/, As Last Updated Nov. 25, 2015, Available as Early as Nov. 22, 2012, 3 pages.

"Turkey Talk-Line," Butterball, Available Online at http://www.butterball.com/turkey-talk-line, Available as Early as Nov. 11, 2013, 3 pages.

"Turkey Facts," University of Illinois Extension, Available Online at http://extension.illinois.edu/turkey/turkey_facts.cfm, Available as Early as Jul. 17, 2015, 5 pages.

Mitzewich, J., "Cooking Turkey for Chickens: Five Simple Rules for Perfect Turkey Every Time," The Spruce, Available Online at https://www.thespruce.com/basics-of-cooking-turkey-101703, Available as Early as Apr. 4, 2017, 8 pages.

\* cited by examiner

COOKING DEVICE FOR IMPROVED HEATING

FIELD

The present description relates generally to methods and systems for cooking poultry and/or other fish, game, vegetables, etc.

BACKGROUND/SUMMARY

Poultry is one of the world's major food sources of protein, with growing demand. Even with various methods available for cooking poultry, the inventor herein has recognized significant issues abound. Consider the proverbial thanksgiving turkey. Cooks struggle, to this day, with finding an efficient, effective way to produce a tasty, well-cooked bird. As a result, turkey hotlines have been set up to respond to the cooking crises faced by consumers. Last year, the Butterball Turkey Talk-Line, open every Nov. and Dec., answered more than 100,000 questions from panicked cooks.

In particular, the inventor herein has recognized that obtaining effective heat transfer from the ambient oven to the inside of the bird is particularly problematic. While some approaches try to address this by tilting the bird, such tilting causes still other issues with size limitations, etc. Further, ensuring even cooking of the meat, in order to maintain a consistent level of juiciness, is difficult to achieve.

In one example, the issues described above may be addressed by a so-called inside-out cooking device. This new device and related techniques enable the turkey to remain horizontal, if desired, while providing efficient and effective heat transfer to the inside of the cooked item. Further, still other advantageous features are provided.

In a particular example, a system for providing a heat transfer device providing even cooking is disclosed. In an example, the system comprises a body with an exterior surface shaped to mate with an internal cavity of an item to be cooked and a filler neck shaped to extend from the body and having an inlet and outlet, the outlet leading to a cavity in the body, the outlet vertically lower than the inlet. In this way, an adjustable system is provided which may allow for manufacture of cooking devices to provide even heating for a variety of different food products comprising an internal cavity enabling simultaneous exterior and interior cooking.

As one example, a heat transfer device is provided to improve cooking speed and quality, wherein the heat transfer device may include a lid for access to the interior of the body so that a cook may add further ingredients, spices, infusions, etc. to provide further flavoring to the meal. In a further example, body port holes are provided and the thickness of the walls of the heat transfer device are approximately of uniform thickness throughout in order to provide superior heat transfer. In addition, the heat transfer device body may comprise a rigid ceramic body which will resist deformation. In short, various examples may provide a variety of improvements over currently available cooking devices regarding even heating, increased cook time, and a more robust device and the significant improvements will be discussed herein.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 1-9 are shown to scale

DETAILED DESCRIPTION

Figure 7:
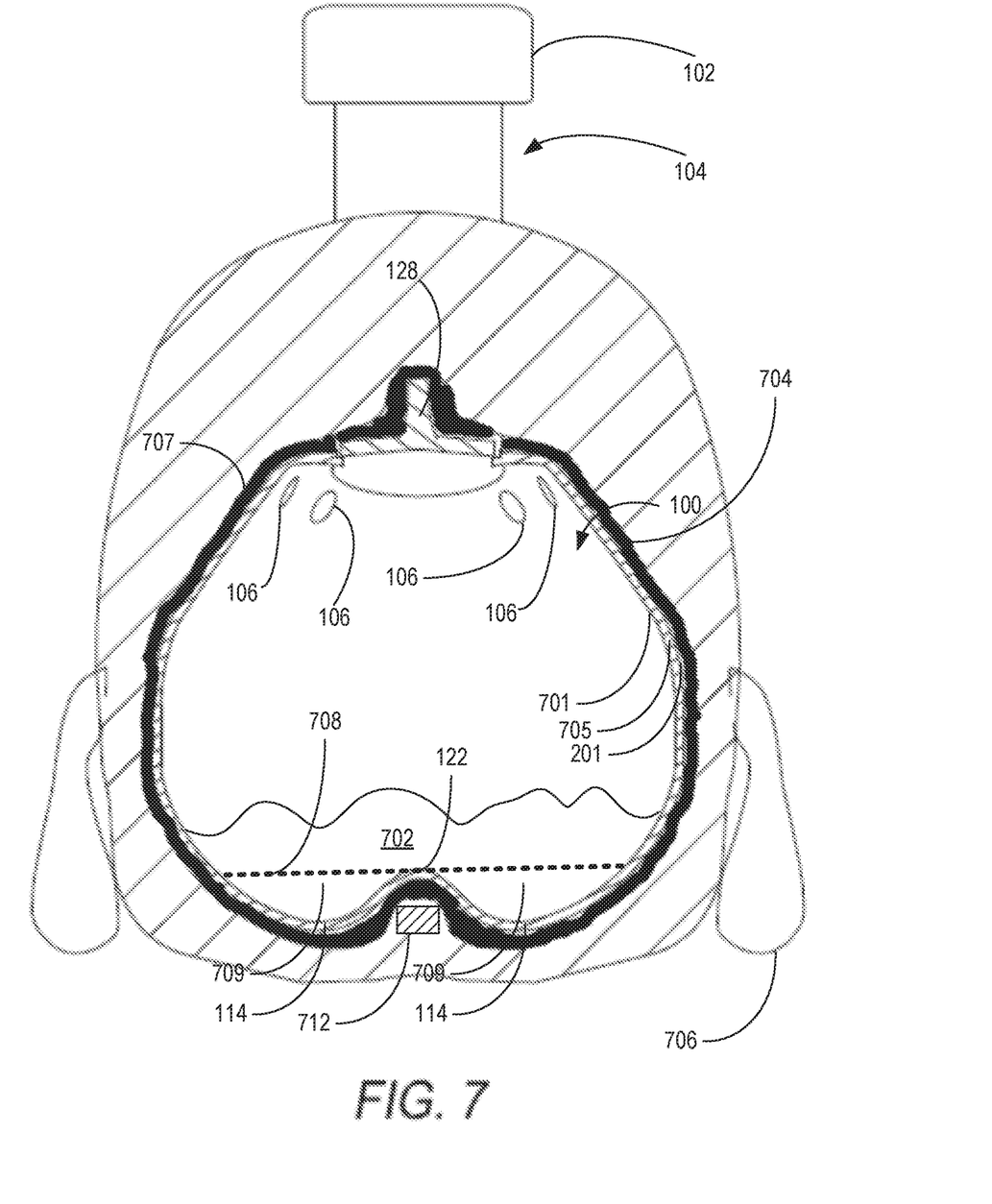
FIG. 7 is a front-facing lateral cross-section perspective of the cooking device.
Figure 8:
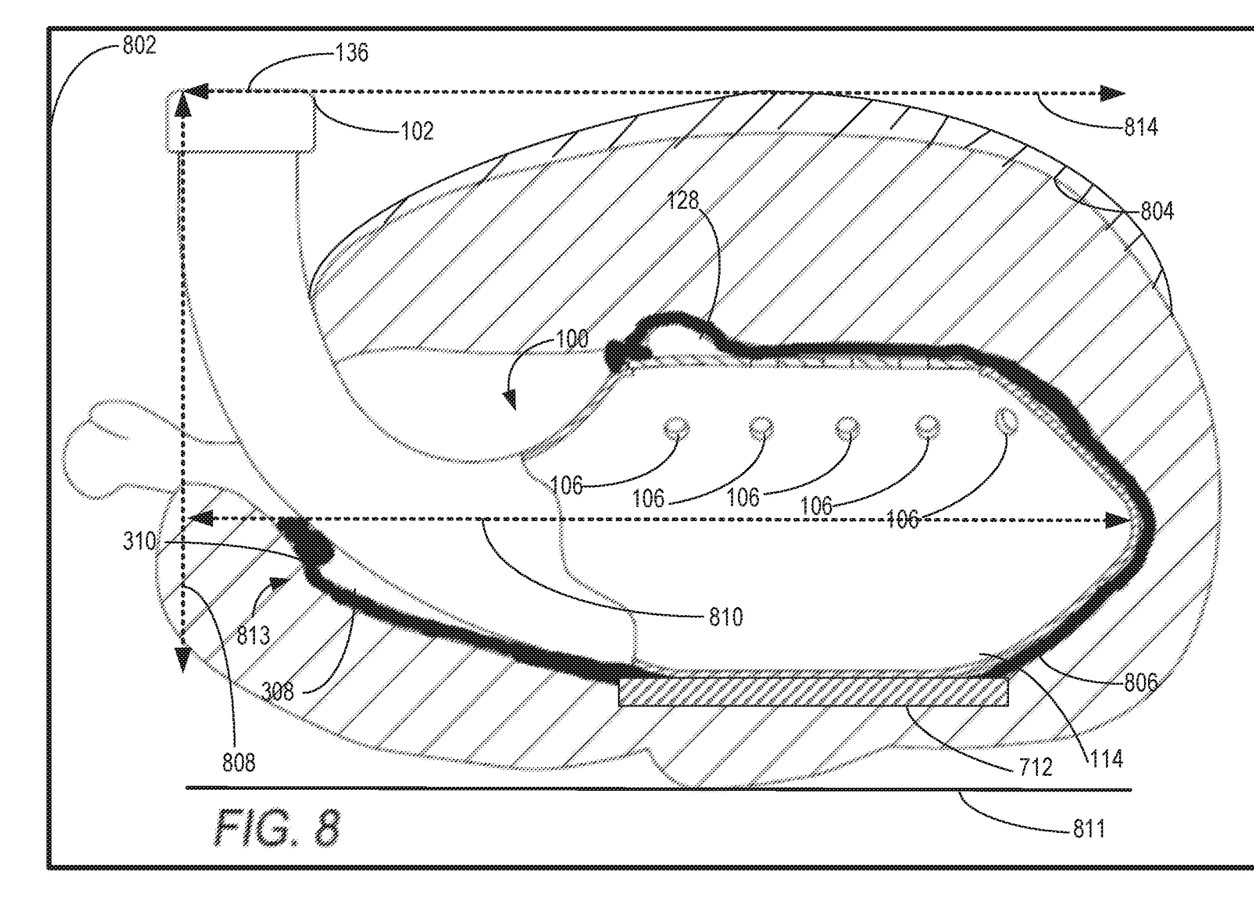
FIG. 8 is a side-facing longitudinal cross-section perspective of the cooking device.
Figure 9:
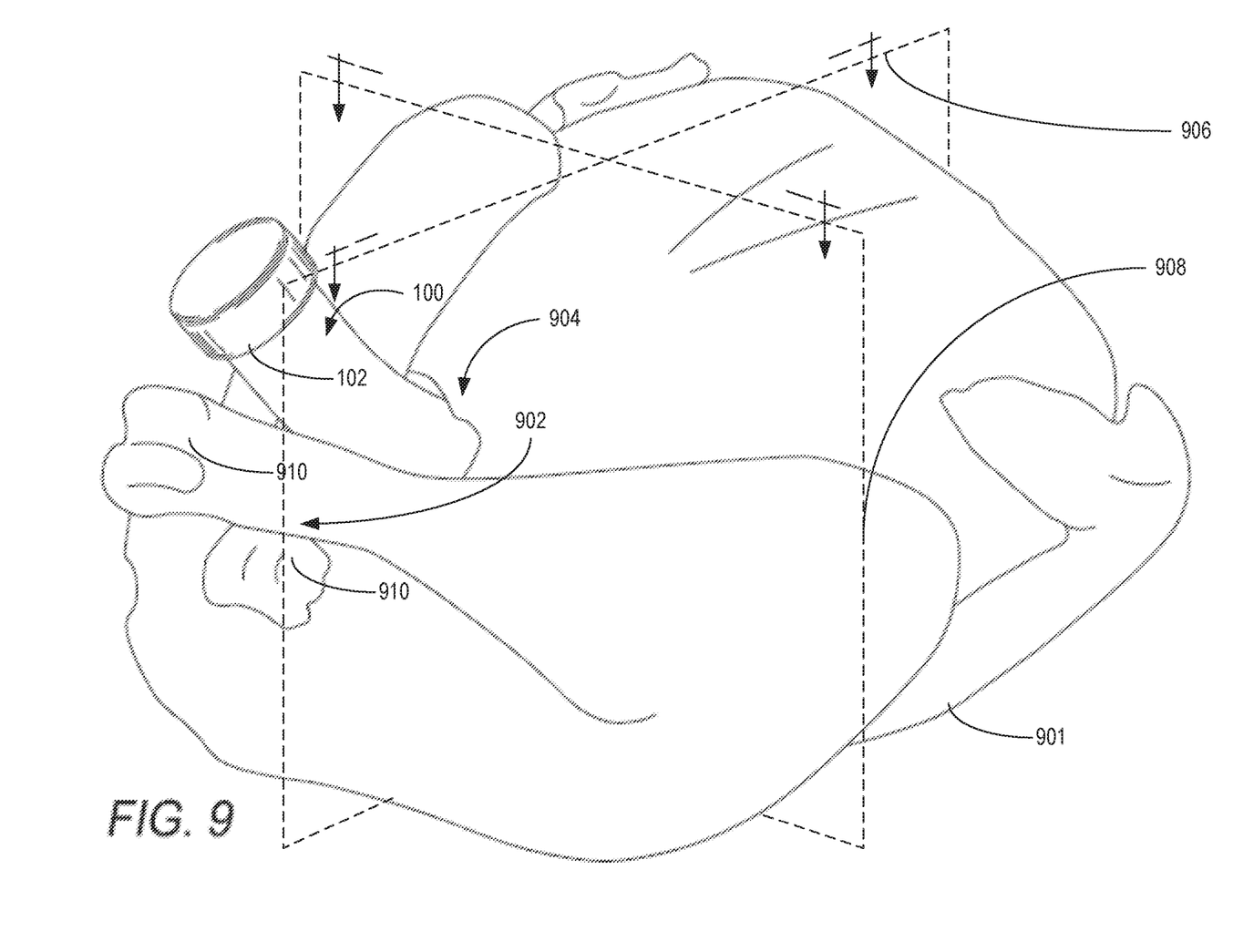
FIG. 9 is a side-angle rear-facing depiction of the cooking device within a food item with superimposed lateral and longitudinal cross section points-of-view representing FIGS. 7 and 8.

The following description relates to an inside-out cooker, for example a device for assisting the cooking of poultry and/or other items. FIGS. 1-6 show various external views of the device. FIGS. 7-8 show cross-sections of the device installed in an example turkey. FIG. 9 shows an external view of the turkey with the device installed in the turkey. The figures are drawn to scale, although other relative dimensions may be used, if desired.

In one example, the device may comprise a hollow vessel made of ceramic or porcelain (or other non-toxic, heat conducting material). The device may be positioned horizontally inside a cavity of the fowl or poultry or other food item being roasted. A larger sized device may be used for larger fowl (e.g. turkeys) and a smaller size for smaller fowl (e.g. chicken). During some uses, the cook slides the device horizontally into the empty cavity of the raw fowl. Before doing so, the cook may perform other operations, such as adding water or another other cooking liquid and/or other flavor enhancers (e.g. herbs) into the hollow vessel, or (2) chose to leave it empty. As described in more detail herein, the device may include a body and a neck. The cook may then place the lid on top of the neck and the top on the opening of the body and then the cook may place the bird horizontally into the oven, grill, microwave, or other cooking device which may incorporate conductive, radiative, or directed heat and/or energy. The neck may be at least partially exposed with the device inserted into the bird, and as such can transfer heat, e.g., via conduction, so that part or all of the ceramic vessel heats up quickly, including the portion inside the bird (e.g., including the body). The device improves cooking of the bird from the inside while the bird may also be cooked from the outside via a roasting method. In some examples, such an approach distributes heat more evenly throughout the meat and makes for a faster cooking process, yet still retaining juiciness.

In some example, liquid placed inside the cavity also heats up and creates steam. The steam flows from the inside cavity, through the walls of the body and into the poultry, and out towards the skin of the bird. If the cook uses a flavored liquid, e.g., broth, wine, etc., with or without herbs and spices, the generated steam penetrates the poultry with its essential taste and aroma. This makes for a moister and more flavorful outcome. The device may further be designed so that cooks can easily add liquid in the middle of the cooking process, as described in more detail below. In an example, it may be desirable for the cook to leave the top off of the neck (leaving the neck open), and in yet other examples, it may desirable for the cook to seat the top upon the neck in a non-sealing manner, thereby closing the opening of the neck and preventing any unwanted debris from entering the neck and thereby, in some examples, the body as well.

As described herein, the device may provide a different option for cooks, one which enhances the traditional process of roasting poultry horizontally in a dry heat source by simultaneously reducing cooking time while more reliably leading to improved outcomes with an extremely simple-to-use and attractive device. In some examples, this methodology introduces heat inside the cavity of a whole fowl, allowing heat to cook the poultry from the inside out while heat from a traditional oven, grill, etc. cooks the poultry from the outside in. As illustrated by the drawings, the device may be designed to easily insert into the cavity of a whole fowl, where the handle allowed the user the ability to maneuver the device with one hand, while the other hand holds the bird steady. Further, it may allow the cook to keep the bird horizontal throughout the cooking and seasoning process (if desired), making for ease of preparation and handling (although non-horizontal positioning may be used, if desired). Cooks can use existing kitchen equipment to achieve successful results (i.e. no special ovens/grills required to accommodate a vertical bird; no extra pans, etc.), if desired. Further, the neck may also function as a handle while also being shaped so that the legs of the bird can be held in a folded position without requiring tying (although leg tying may be used, if desired). In some examples, no seasoning, fluids, infusions, etc. are needed to produce a high quality cooked poultry or other food item as the structure and materials of the cooker provided herein will alone improve the quality of the food item.

The body of the device may be inserted into the cavity of a whole bird before cooking or part way through cooking, and can remain there throughout baking or as long as the cook desires, or be removed part way through cooking. The neck may be shaped to extend up from and out of the cavity when inserted, reaching up to approximately the height of an average bird as shown in FIG. 8, for example. The neck may be used to easily place and remove the device from the inside of the bird. Because of its design, the device also sits stably on the counter as well as inside the bird's cavity. In this way, the device can be pre-loaded without causing issues with potentially spills before placement of the device in the bird.

The device is thus able to help moisten and flavor the poultry meat while reducing the need for time-consuming, awkward tasks such as brining or regular basting (although such approaches may be used in combination with the device, if desired). Liquids (beer, wine, broth, water, etc.) with or without herbs/spices can be poured into inner cavity. Ports, such as holes in the top of the body, allow the aromatic steam to infuse into the meat while it is cooking.

The neck may be used to pour this liquid into the body even during cooking and after insertion into the bird. Also, it is possible to use the device without adding liquid to it if the cook prefers dry heat.

Once the bird—with the device inserted—is in a heated oven, grill, or microwave, the neck absorbs ambient heat, conducting it down to the body of the vessel. The body then becomes hot. This heat then is conducted and/or radiates out into the inner part of the bird and also heats up any liquid to create steam, promoting the cooking of the poultry from the inside as the outside is being roasted from the heat of the oven or other cooking device. In some examples, as the device itself heats up, it cooks the turkey from the inside out in addition to the usual baking.

The body and/or neck may comprise ceramic or porcelain, for example via slip casting. However, other materials such as glass, metal, and/or combinations thereof with ceramic or other materials, may be used.

In slipcasting, a liquid clay body slip is poured into plaster molds and allowed to form a layer, the cast, on the inside walls of the mold. For a hollow cast mold, once the plaster has absorbed most of the liquid from the outside layer of clay the remaining slip is poured off for later use. After a period for further absorption of water, the cast piece is removed from the mold once it is firm enough to handle without losing its shape. It is then "fettled" (trimmed neatly) and allowed to dry out further, usually overnight or for several hours. This produces a greenware piece which is then ready to be decorated, glazed and fired in a kiln. As part of the fettling, holes may be drilled into the body. The top and lid may be made by slipcasting or other processes such as handbuilding. The final product can be fired and may or may not be glazed.

In an example, there may be a recessed ridge formed between two or more rails formed on the bottom of the body of the greenware piece, and the rails may or may not be glazed. The rails may support the greenware piece as it sits in the kiln during firing. As mentioned below, the rails may additionally support the final product when sitting on a flat surface, and the recessed ridge may additionally allow the final product to fit better inside a food item being cooked. In this way, there are reduced issues with printing and forming the final product. Additionally, slipcasting allows for shaping of the greenware piece such that the final product or other parts of the final product will not be left behind in the meat.

FIGS. 1-9 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing or surface-sharing contact with each other may be referred to as in face-sharing or as in surface-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

For the sake of clarity, FIGS. 1-9 may be discussed collectively.

Figure 1:
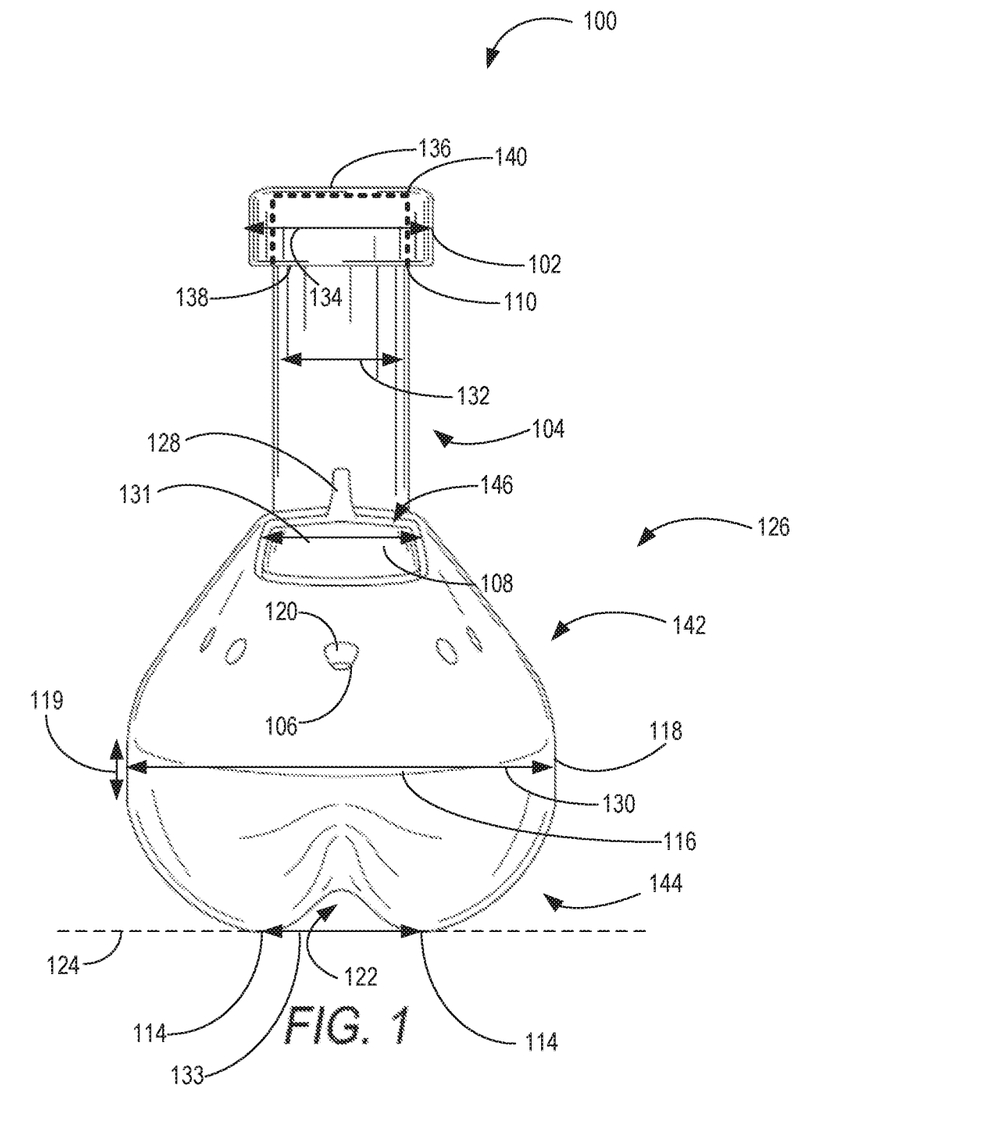
FIG. 1 is a front-facing depiction of the cooking device.

Turning now to FIG. 1, a preferred embodiment of the cooker 100 is provided with a front-facing perspective, wherein the front of the cooker is pointed directly towards a viewer. The cooker, as previously mentioned, includes a neck top cover 102 to sit upon a neck portion 104 in a non-sealing manner, a body portion 126, and a body lid 108. As an example, the top cover 102 may be removable.

As an example, the body portion 126 of the cooker may include a mid-line 116 in a mid-region which vertically segments the body into an upper body portion 142 and a lower body portion 144 and defines the widest lateral portion of the body 126, wherein the mid-line 116 may have lateral width 130. As an example, the mid-line 116 may trace a mid-region 118 having a vertical height 119 and lateral width 130. As a further example, the shape of the body narrows both longitudinally and laterally from the mid-line 116 and/or mid-region 118. As an example, the upper body portion 142 narrows laterally as the upper portion ascends vertically. Similarly, the lower body portion 144 narrows laterally as the lower body portion descends vertically. Longitudinal narrowing may be described in more detail with reference to FIG. 3. As an example, mid-line 116 and/or mid-region 118 may have a mid-body lateral width 130 and the lateral width of the body 126 may decrease upon ascending the upper body portion 142 until reaching the opening 146 wherein the opening may have a minimum upper body lateral width 131. Similarly, the lateral width of the body may decrease upon descending the lower body portion 144 until reaching the bottom-most portion of the bumps (or rails) 114, wherein the distance between the rails may be a minimum lower body lateral width 133. In an example, 131 and 133 may be equivalent or non-equivalent.

The neck portion 104 or filler neck may be a tubular structure, at least partially, and may form a unitary structure with the body portion 126. In an example, the neck 104 and body 126 may form the unitary structure as they may be cast and/or slipcast and/or formed as one, inseparable device. The tubular structure of the neck 104 may curve and flare (optionally increasing in tube diameter) where the neck 104 joins with the body portion 126. The top 102 and lid 108 are separate, discontinuous structures from the combined unitary structure of the body 126 and neck 104, and are separate discontinuous structures from one another. As an example, the top 102 may also have a tubular structure closed on one end 136 and open on another 138. In an example, open end 138 of top 102 fits over a top open portion 110 of the neck 104 having an open end 140, and the closed end of the top 136 may then be seated upon the top open end 140 of the tubular neck 110 as the closed end of the top 136 rests upon and is seated upon 140. As an example, closed end of the top 136 may not completely seal top open end 140 in order to allow the release of pressure buildup of gases within the body 126 or neck 104 as the cooker heats up. Top open end 140 of neck 104 may be vertically higher than every portion of an opening at an intersection with the body. In an example, neck 104 having a diameter of 132 is sealed partially by tubular top 102 having a diameter 134 greater than diameter 132. As an example, partial sealing of neck 104 via top 102 may be advantageous to a chef cooking food if the chef desires to infuse the cavity of the food item with flavoring contained inside the cooker. As an example, by partially sealing the neck 104, the cooker may vent flavorings contained inside the cooker through lid and body port holes (described below) both of which are positioned on the body and lid of the cooker which remain within the food cavity during cooking. As such, flavorings are vented through lid and body ports, which are in contact or nearly in contact with the inner cavity of the food item, thereby infusing the material of the food item.

Continuing with FIG. 1, the body 126 of the cooker may be configured with an opening 146 on a top portion of the upper body portion 142. As an example, the opening 146 may be drilled during the fettling mentioned above. Opening 146 may be located on the top portion of upper body portion 142 and may be configured to be partially sealed by lid 108 resting upon upper body portion 142 in a non-sealing manner. As an example, lid 108 may additionally include a handle 128 so that it may be easily lifted off of contact with the upper body portion 142 circumscribing the opening 146.

As an example, upper body portion 142 may additionally comprise body ports 106 which may go through the walls of the body 126 of the cooker and the body ports 106 may comprise openings on both external and internal surfaces of the body 126 allowing communicative coupling between external and internal surfaces of the body via body port surfaces 120. As an example, body ports 106 may be located on the upper body portion 142 and positioned radially outward from the opening 146. In an example, the body ports 106 may all be positioned equidistant from the edges of the opening 146.

As a further example, the unitary structure of the body 126 and the neck 104 may be comprised of walls having approximately uniform thickness. However, in another example, the walls of the body 126 may comprise thicker walls than the neck 104.

Furthermore, lower body portion 144 of the body 126 of the cooker may further include bumps 114 formed by recessed ridge 122. In such an example, an apex of recessed ridge may have a height above a surface 124 which the cooker may be standing on, wherein the height of the recessed ridge is configured to provide optimal shape matching between the cooker and the food item cavity. Additionally, recessed ridge may have a width between bumps 114 which may be similarly configured to provide optimal shape matching between the cooker and the food item cavity.

Figure 2:
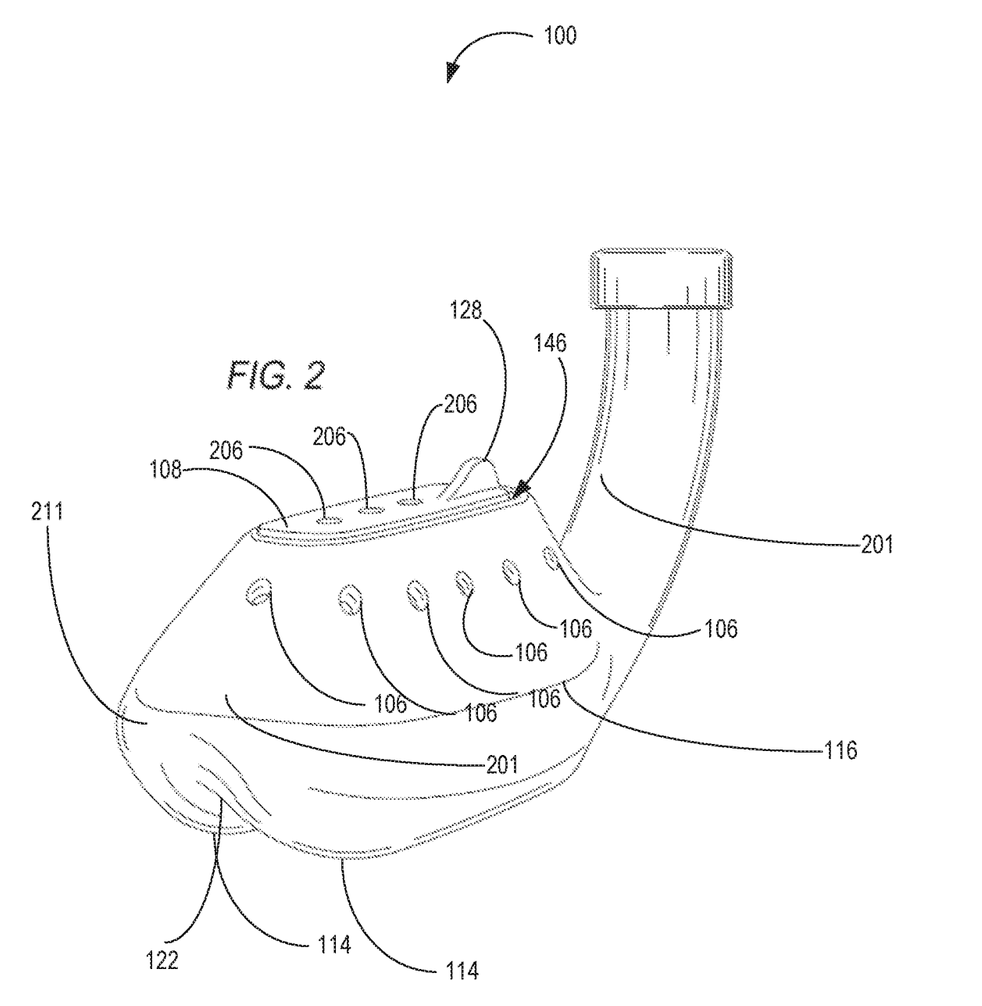
FIG. 2 is a side-angle front-facing depiction of the cooking device.

Turning now to FIG. 2, a front-angle perspective of the cooker is provided. Not seen previously in FIG. 1, as an example, lid 108 may additionally comprise lid ports 206 in order to provide further venting and/or steaming of liquids stored within the cooker in addition to venting and/or steaming already provided by ports 106. In an example, lid ports 206 may be positioned along a longitudinal axis of the lid 108. In an example, lid ports 206 may be positioned a first positioning distance away from the edges of the lid 108 so that no lid ports are within the positioning distance to the edges of the lid, and ports 206 may also be positioned a second positioning distance away from one another. As an example, keeping the lid ports 206 spaced away from the edges of the lid 108 and positioned away from one another may produce a stronger lid that may resist the wear and tear of contacting the upper body portion 142. As an example, if the lid ports 206 may be very close to one another and close to the edge of the lid, then the lid's structure may be weaker due to having less material between ports and holes. As a further example, the first and second positioning distances described above may also be applied to body ports 106 (wherein the first positioning distance for the body parts would position the ports 106 away from the opening 146 instead of the edges of the lid 108) so as to provide a stronger body 126. In a further example, the upper body portion 142 may be sealed along the opening 146 and may not include a lid 108 allowing any venting of gases or flavors during heating. However, lid ports 206 may be included in the sealed body via being included as further vertical facing body port holes.

As an example, sloping of the upper body portion 142 due to the lateral narrowing as the upper body portion ascends vertically, provides body ports 106 positioned on a sloped portion of the upper body portion 142. In such an example, body ports 106 may face outwards at a skewed angle with respect to the lid ports 206 which face directly vertically upwards. As a further example, body 126 of cooking device 100 may have a nose 211 along the front face of the device. In an example, the nose 211 may be the most longitudinally-forward point along the mid-line 116 of the device 100.

As an example, cooking device 100 may additionally include exterior surfaces 201 along the outside of the walls of cooking device 100, wherein the walls of cooking device 100 may include the unitary body of body 126 and neck 104. As an example, exterior surfaces 201 of cooking device 100 may be glazed with any applicable glaze. As a further example, the walls and glazes are inert materials without lead additives and which may be strongly resistant to chemical and physical degradation.

Figure 3:
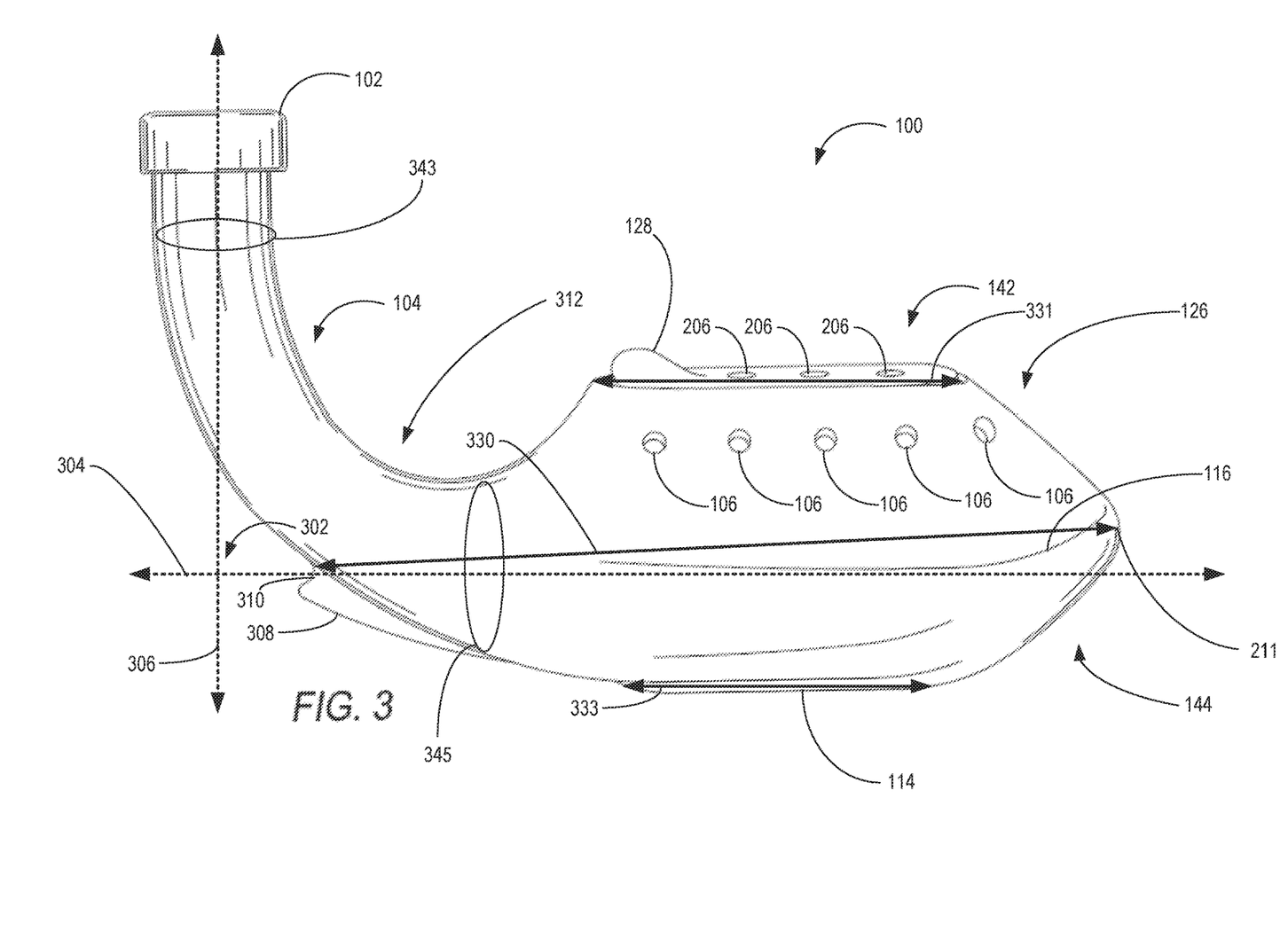
FIG. 3 is a side-perspective depiction of the cooking device.

Turning now to FIG. 3, a side-perspective of the cooker is provided. As an example, mid-line 116 may follow the longitudinal axis 304 of the body portion and may intersect perpendicular with vertical axis 306 of neck portion 104. In an example, the angle of intersection 302 between the vertical axis 306 of the neck 104 and the longitudinal axis of the body 126 may be 90 degrees. In one example, the angle 302 may be more than 20 degrees. In one example, the angle 302 may be more than 30 degrees. In one example, the angle 302 may be more than 45 degrees. In one example, the angle 302 may be between 70 and 100 degrees.

In an example, a support projection 308 may be provided attached to bottom of the flared end of the neck 312 where the neck forms with the body 126 of the cooker. The support projection 308, as an example, may include a cavity-matched and/or body-matched recess 310 which may prevent the cooker from slipping out of the cavity of the food item during the cooking process as the support projection 308 may provide resistance against an edge of an opening of the food item being cooked. In some examples, support projection 308 may additionally be a handle and include a hollowed-out section for use as a handle. In some examples, the support projection may extend downward of the flared end of the neck 312 opposite the direction of an upper portion of the neck which ascends to the open end of the neck 140.

Continuing with reference to FIG. 3, longitudinal narrowing for the upper body portion 142 and lower body portion 144 may be seen. In an example, moving vertically upward from the mid-line 116, the upper body portion 142 may narrow longitudinally, and moving vertically downward from the mid-line 116, the lower body portion 144 may narrow longitudinally as well.

With continued reference to FIG. 3, bumps 114, as an example, may extend longitudinally along the body 126 so as to support the cooker and allow the cooker to stand flat on a surface. Longitudinally extended bumps 114 which may lie flat on a surface may be of assistance to a chef as it will allow the chef to simply stand the cooker on a kitchen surface while the chef fills the inside body of the cooker—rather than having to hold the cooker in place so as to avoid rolling or falling over.

As a further example, mid-line 116 and/or mid-region 118 may have a mid-body longitudinal length 330 and the longitudinal length of the body 126 may decrease upon ascending the upper body portion 142 until reaching the opening 146 wherein the opening may have a minimum upper body longitudinal length 331. Similarly, the longitudinal width of the body may decrease upon descending the lower body portion 144 until reaching the bottom-most portion of the bumps (or rails) 114, wherein the distance longitudinally along the rails may be a minimum lower body longitudinal length 333. In an example, 331 and 333 may be equivalent or non-equivalent. In an example, the mid-body longitudinal length 330 may reach from the upper-most portion of the recess 310 of the support projection 308 to the nose 211.

As a further example, cooker 100 may include a first cross-section of the neck 343 at or near the inlet of the neck, and a second cross-section of the neck 345 at or near the flared region 312, wherein, as an example, the area of the second-cross section 345 may be greater than that of the first cross-section 343 inlet, the cross-sections being approximately circular. As a further example, the body 126 may have a top 331 and bottom 333 surfaces smaller than a cross-section of the body at a mid-line 330 of the body.

Figure 4:
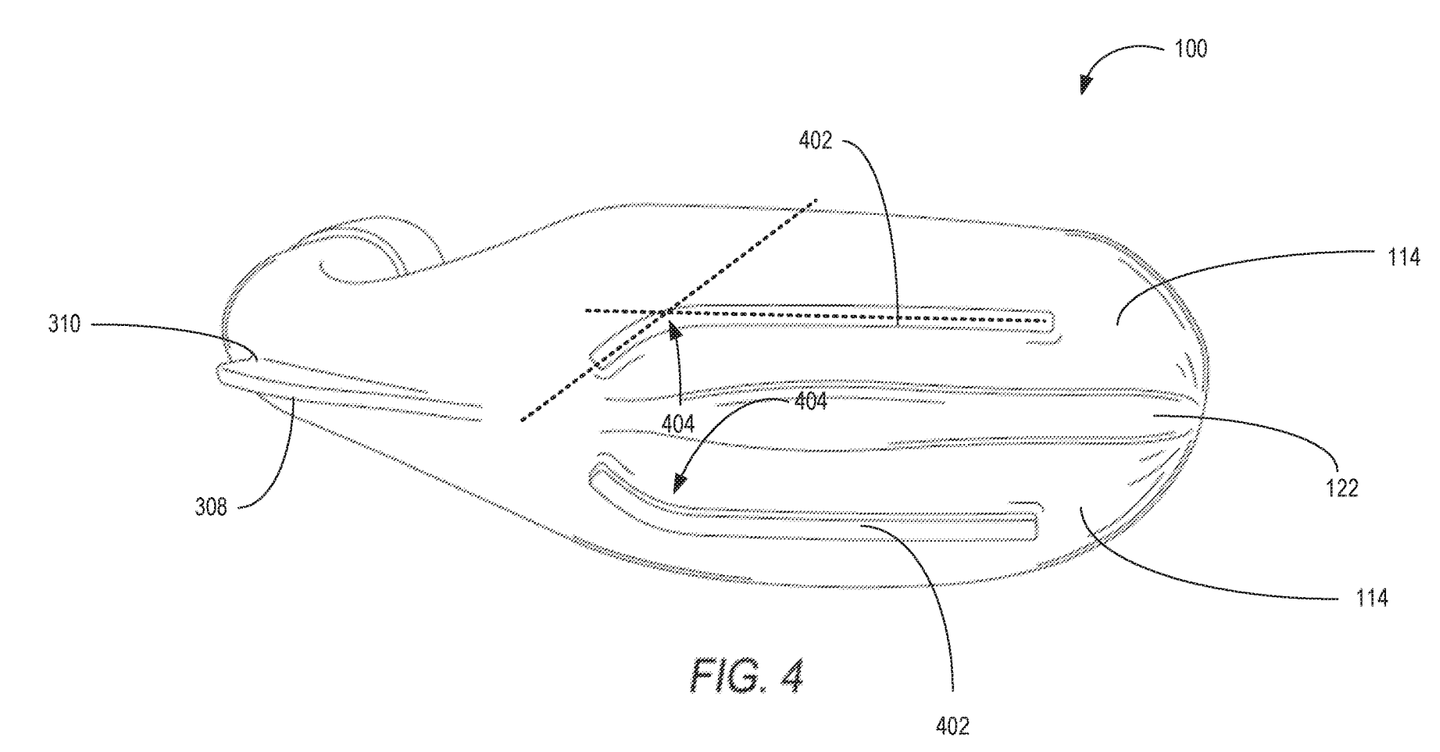
FIG. 4 is a bottom-facing perspective of the cooking device.

Turning now to FIG. 4, a bottom perspective is shown for the cooker. As described with respect to FIG. 3, bumps 114 may extend longitudinally along the bottom side of the lower body portion 144 of the body 126 of the cooker. In an example, bumps 114 may additionally also include rails 402. Rails 402, as an example, may be the same ceramic material as body of the cooker 126 and may further be slipcast, cast, and/or formed as part of the lower body portion 144 of the cooker. Rails 402, as an example, may be partially shaped as rectangular prisms formed to the bottom of bumps 114. Rails 402, as an example, may also additionally include a bend 404 and may alter the shape of the rails to a bent rectangular prism. In an example, the bend 404 of rails 402 may be more than 75 degrees. In an example, the bend 404 of rails 402 may be more than 115 degrees. In an example, the bend 404 of rails 402 may be more than 140 degrees. In an example, the bend 404 of rails 402 may be between 150 and 200 degrees. In an example, the bend 404 of rails 402 may be 90 degrees. As a further example, the bumps 114 may additionally trace the path of the bent rails 402.

In a further example, referring to FIG. 4, cooker may include lower body portion 144 wherein lower body portion 144 may not comprise bumps 114 or recessed ridge 122. In such an example, only rails 402 may be included on the bottom of the cooker. For clarification purposes the "bottom" of the cooker may be understood to be the face of the body 126 of the cooker opposite the opening 146 including the face of the neck 104 where the support projection 308 erupts. As an example, contrastingly, the "top" of the cooker may be understood to be the face of the body 126 of the cooker displaying the opening 146 including the face of the neck displaying the top open end of the neck 140.

Figure 5:
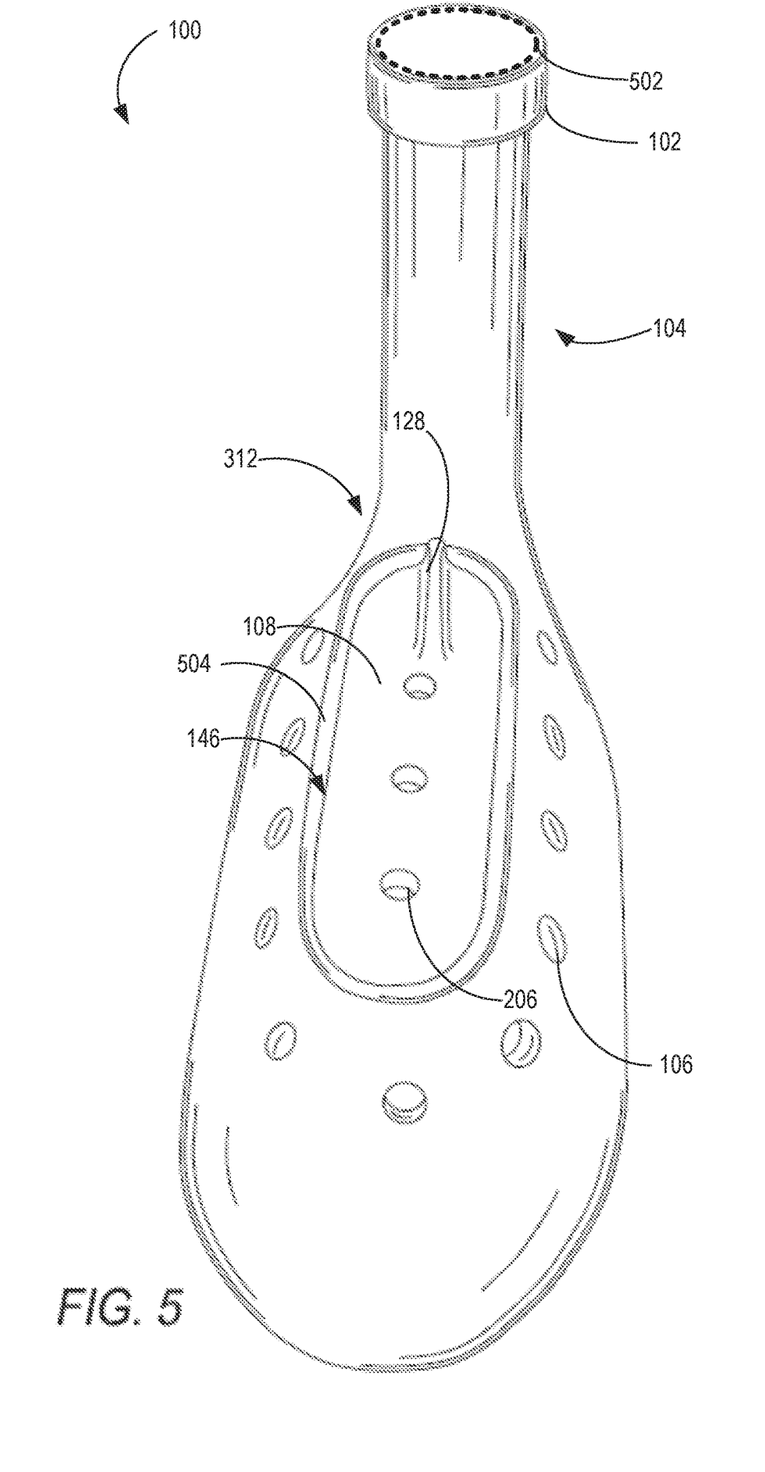
FIG. 5 is a top-facing perspective of the cooking device.

Referring to FIG. 5, a top, angled perspective is shown for the cooker. As mentioned above, the neck 104 may be a tubular element with open ends on both sides. As shown from the top, angled perspective of FIG. 5, an opening of the top end of the neck 104 is shown as dotted line 502 through top 102. As an example, tubular neck may be circular or elliptical through the vertical neck portion along the vertical neck axis. As an example, top end 502 may be the highest vertical element of the unitary structure comprising body 126 and neck 104 and no other element of the unitary structure may sit above it when the cooker is at rest on rails and/or bumps set upon a flat surface.

Continuing with FIG. 5, adjacent to and surrounding opening 146, in an example, recessed outer surface 504 may be included with upper body portion 142. In an example, lid 108 may rest upon the recessed surface 504 surrounding opening 146 so as to sit between upper body portion 142 and lid 108. As a further example, the area around the opening 146 facing the flared end of neck 312 region, where neck 104 merges with body 126, may additionally not include any body port holes 106. As an example, the flared end of neck region may act also an as outlet for the tubular neck 104, wherein the outlet communicatively couples the interior of the body 126 with the interior of the tubular neck 104. As an example, the area around the opening 146 facing region 312 may not include any port holes as it is a structurally critical area. However, in some examples, where the longitudinal distance of the flare region 312 exceeds a flare threshold, body port holes 106 may completely circumscribe the opening 146.

Figure 6:
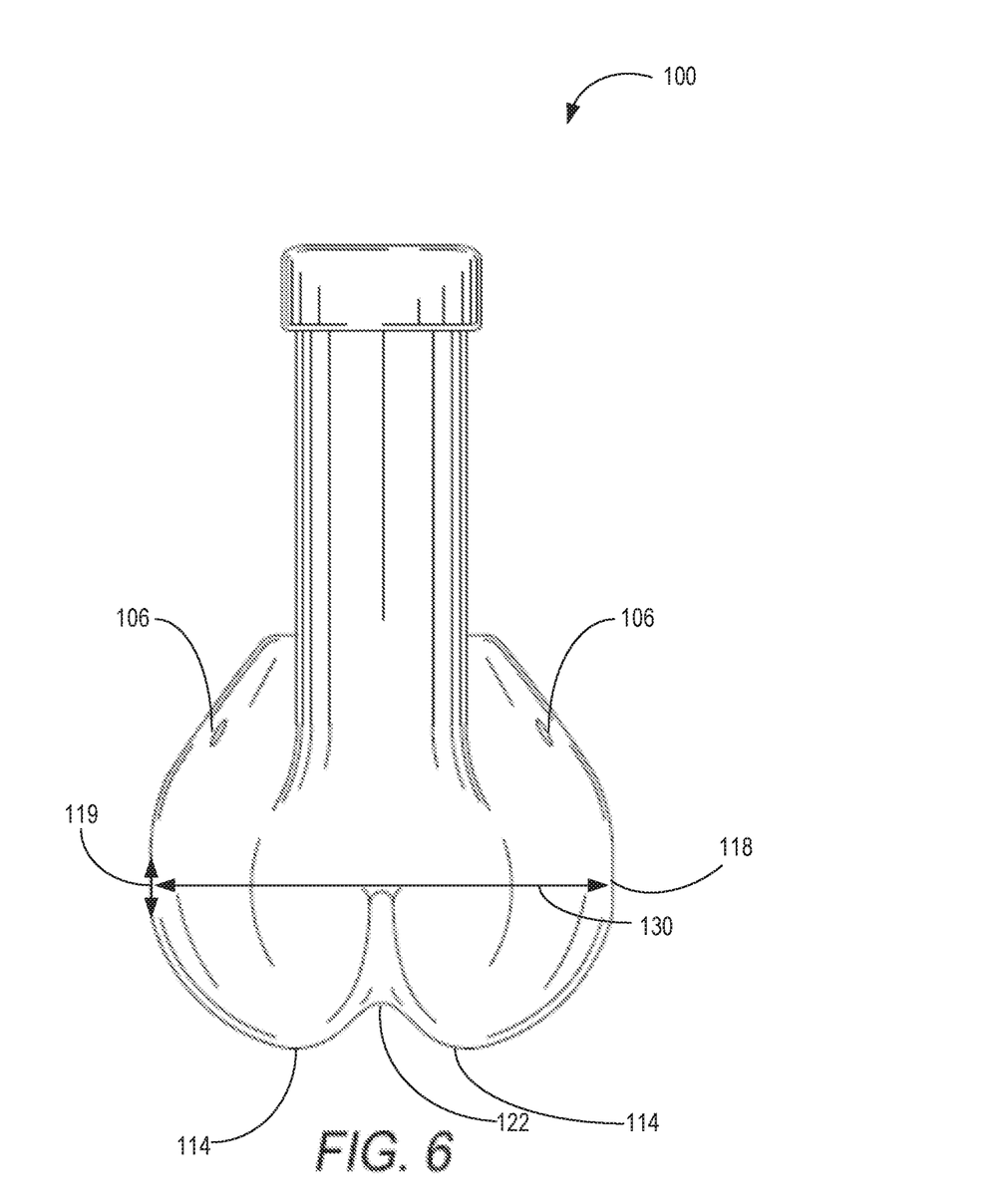
FIG. 6 is a back-facing perspective of the cooking device.

Referring now to FIG. 6, a rear-facing perspective is shown for the cooker. As an example, FIG. 6 further illustrates mid-region 118 having a vertical height 119, wherein, as an example, along the vertical height of the mid-region there may be no lateral narrowing upwards or downwards. As a further example, the vertical height 119 of the mid-region 118 may be adjusted to different heights in order to fit different food items or sizes of food items. As another example, any other length, width, or height attribute of the cooker 100 mentioned herein may be adjusted in order to fit different food items or sizes of food items.

Turning now to FIG. 7, a front-facing cross-sectional representation of the cooker 100 placed within a food item, for example, within a poultry item, is shown. As an example, the cross-sectional representation of FIG. 7 illustrates the inner surface 701 and outer surface 201 of cooking device 100 walls 705. As an example, inner surfaces 701 may contact cooking ingredients and/or cooking infusions 702. As an example, outer surfaces 201 may contact cavity walls of food item 706 based upon construction, configuration, and/or molding of walls 705. In some examples, walls 705 may have uniform thickness throughout the cooker 100, however, in some other examples, walls 705 may not have uniform thickness throughout the cooker 100. In one example, wall 705 thicknesses may be thicker along bumps 114 so as to alter the bottom of the cooker to have inner surfaces 701 run along modified line 708, wherein areas (or recesses) 709 may be filled-in thicker areas of wall material. In an example, adjusting wall thickness in order to simplify inner surfaces 701 (i.e. less topography with bumps 114 being unfilled) may be helpful and provide easier cleaning of the inside of the cooker 100, as recesses 709 may be filled in and otherwise may be difficult to wash out. As another example, wherein recesses 709 may not be filled in with wall material 705, food and/or ingredients may sit within recesses 709.

As mentioned above, exterior surfaces 201 may be included along the exterior of cooking device 100 including the exterior of the unitary body of body 126 and neck 104. As a further example, inner surfaces 701 may also be included along the interior of cooking device 100 including the interior of the unitary body of body 126 and neck 104. For reference, as an example, "interior" may refer to the side of the walls 705 which are not in contact with the food item 706 and/or are not facing the cavity or heating oven. As an example "exterior" may refer to the side of walls 705 which are in contact with the food item 706 and/or are facing the cavity and heating oven. Additionally, as an example, walls 705 may comprise the unitary body of body 126 and neck 104 and may be surrounded by inner and outer surfaces 701 and 201. As an example, both surfaces 201 and 701 may be glazed, or only one surface may be glazed, or neither surface may be glazed.

As an example, heat may transfer through cap 102 and neck 104 to heat walls and surfaces 701, 201, 705 evenly and provide even heating along cavity-contacting cooker 100 to cavity walls 707 via a cavity-surface contacting region 704. At the cavity-surface contacting region 704, cavity walls 707 may mate with outer surfaces of the cooker 201 in a uniform or non-uniform fashion. In some cases if the cavity of the food item is large, than cavity walls 707 may mate with outer surface of the cooker 201 in a non-uniform fashion. Additionally, if the cavity of the food item is smaller, then cavity walls 707 may mate with outer surface of the cooker 201 in a uniform or more uniform fashion than when the cavity may be too large, such as in the previous example. Additionally, body port holes 106 may provide additional steam and/or flavor infusion and/or cooking due to heating of ingredients and/or infusions 702. As an example, recessed ridge 122 and bumps 114 are configured to accommodate cooking item structural features, for example feature 712 which fits between bumps 114 and runs longitudinally along recess 122. In an example, structural feature 712 may include a poultry and/or fowl spine or backbone.

Turning now to FIG. 8, a side-perspective cross sectional representation is shown of the cooker placed within a food item, for example, within a poultry item, wherein both the food item 804 and cooker 100 are placed with an oven or heat-generating cooking device 802. As explained above, but now shown with side-perspective cross section, a cavity-surface contacting region 806 is provided wherein the outer surface of the unitary body of cooking device 100 is configured to be contacting with the food item cavity. As a further example, the cooking device may have attributes including neck height 808 for neck 104 and longitudinal length 810. Attributes 808 and 810 may be adjusted in order to better fit different sized food items and improve cooking quality. As an example, it may be preferable to have the top of cap 136 (or top of neck 104) at approximately equivalent vertical heights with respect to a cooking surface 811 upon which the item 804 is placed. Such an approximate equivalence in height may provide the proper sizing of cooking device 100 to food items 804. As an example, recessed ridge 122 and bumps 114 are configured to accommodate cooking item structural features, for example feature 712 which fits between bumps (and/or rails) 114 and runs longitudinally along recess 122. In an example, structural feature 712 may include a poultry and/or fowl spine or backbone.

As a further example, body-matched recess 310 of support projection 308 may grab onto cavity section 813, near the entryway of the cavity. In such an example, body-matched recess 310 may prevent the cooking device 100 from slipping out of the cavity if there is an increase in food item pressure on the cooking device.

Referring now to FIG. 9, a side-angle perspective of the cooking device 100 placed within food item 901 is provided. As an example, food item 901 appendages 910, for example turkey legs, may be crossed over one another and locked into and/or hooked into body-matched recess 310 at location 902 of support projection 308, on the bottom-facing side of the neck 104. As another example, food item appendages 910 may be crossed over one another and placed on the top-facing side of the neck 104 at location 904, thusly, pushing body-matched recess 308 of support projection 310 downward and grabbing into (previously shown) turkey cavity section 813.

Additionally illustrated in FIG. 9 are cross-sections 906 and 908, which are respectively shown as FIG. 8 and FIG. 7. As a further example, the cooker 100 may be constructed from glass, ceramic, plastic or any other non-porous material.

In this way systems and methods are presented for providing a superior internal cooking device which solves problems associated with current internal cooking devices such as uneven heating, material weaknesses, poor cooking quality.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A device, comprising:
a body with an exterior surface shaped to mate with an internal cavity of an item to be cooked; and
a filler neck shaped to extend from the body and having an inlet and an outlet, the outlet leading to a cavity in the body, the outlet vertically lower than the inlet, wherein the filler neck extends outward from the body at the outlet, a top of the body longitudinally spaced away from the inlet and vertically higher than the outlet; wherein the inlet is coupled to a removable cover, the body having an upper portion sloping due to lateral narrowing as the upper portion ascends vertically, the body including body ports positioned on the sloped upper portion, the body having a nose positioned opposite the filler neck, the nose being the most longitudinally-forward point along a mid-line of the device.

2. The device of claim 1, wherein the exterior surface includes a recessed ridge at a bottom region, the ridge shaped to mate with a backbone of the item to be cooked, and where the top of the body is vertically lower than the inlet, wherein the filler neck flares outward at the body.

3. The device of claim 1, wherein the filler neck is tubular-shaped and includes a bend, wherein the outlet faces the body, and wherein the filler neck itself bends 90 degrees.

4. The device of claim 1, wherein the filler neck and the body are a unitary one-piece structure inseparable from one another, wherein the exterior surface is glazed and the body and the filler neck are ceramic.

5. The device of claim 1, wherein the body includes an opening at the top, and wherein a bottom of the body is sufficiently flat so that the device is stably positioned on a flat surface, and wherein a cap covers the inlet of the filler neck and sits atop the filler neck inlet.

6. The device of claim 1, wherein a shape of the exterior surface of the body is bulbous relative to the filler neck, the filler neck having a curve of 90 degrees, a cross-section of the filler neck at the outlet being greater than at the inlet, the cross-section being circular, the body having top and bottom surfaces smaller than a cross-section of the body at a mid-line of the body.

7. A device, comprising:
a body with an exterior surface shaped to mate with an internal cavity of an item to be cooked; and
a filler neck shaped to extend from the body and having an inlet and an outlet, the outlet leading to a cavity in the body, the outlet vertically lower than the inlet, wherein the filler neck extends outward from the body at the outlet, a top of the body longitudinally spaced away from the inlet and vertically higher than the outlet, further comprising one or more venting ports, wherein a nose of the body that is the most longitudinally-forward point along a mid-line of the body is opposite the outlet of the filler neck, wherein the nose is closed, and wherein the one or more venting ports are positioned on the body above the mid-line and vent from within the body to exterior to the body.

8. A device, comprising:
a body with an exterior surface shaped to mate with an internal cavity of an item to be cooked; and
a filler neck shaped to extend from the body and having an inlet and an outlet, the outlet leading to a cavity in the body, the outlet vertically lower than the inlet, wherein the filler neck extends outward from the body at the outlet, a top of the body longitudinally spaced away from the inlet and vertically higher than the outlet, wherein the device is comprised of ceramic material, wherein the exterior surface is glazed, wherein the top of the body extends longitudinally and is substantially flat and has a lateral width narrower than a longitudinal length, and wherein the body includes a plurality of venting ports.

9. A device, comprising:
a body with an exterior surface shaped to mate with an internal cavity of an item to be cooked; and
a filler neck shaped to extend from the body and having an inlet and an outlet, the outlet leading to a cavity in the body, the outlet vertically lower than the inlet, wherein the filler neck extends outward from the body at the outlet, a top of the body longitudinally spaced away from the inlet and vertically higher than the outlet, wherein the exterior surface is glazed, wherein the body includes a mid-line in a mid-region which vertically segments the body into an upper body portion and a lower body portion and defines a widest lateral portion of the body, wherein a shape of the body narrows both longitudinally and laterally from the mid-line toward the top, wherein the lower body portion narrows laterally as the lower body portion descends vertically, the lateral width of the body decreasing upon descending the lower body portion until reaching the bottom-most portion of a longitudinally extending pair of rails, and wherein a distance between the rails may be a minimum lower body lateral width.

10. A device, comprising:
a body with an exterior surface shaped to mate with an internal cavity of an item to be cooked; and
a filler neck shaped to extend from the body and having an inlet and an outlet, the outlet leading to a cavity in the body, the outlet vertically lower than the inlet, wherein the filler neck extends outward from the body at the outlet, a top of the body longitudinally spaced away from the inlet and vertically higher than the outlet, wherein a shape of the exterior surface of the body forms a narrowing from a mid-line to a top opening in a vertical direction from all sides, and a narrowing also toward a bottom surface from the mid-line, and wherein a bottom of the body has a recessed ridge, an apex of the recessed ridge having a height above a surface on which the device rests, and where the top of the body is vertically lower than the inlet.

11. A device, comprising:
a body that has a top and a bottom that are both narrower longitudinally and laterally with respect to a mid-region, the body defining an internal cavity;
a neck fluidically coupled with the internal cavity, the neck extending out from the body and vertically upward, the neck open at a top end, the opening vertically higher than every portion of an opening at an intersection with the body, the top of the body spaced away longitudinally from the neck, wherein the neck is curved upward; and
a projection extending from the body and/or the neck downward, wherein the body is ceramic, wherein a bottom wall of the body includes a recessed ridge, the ridge extending longitudinally along a bottom of the body, and wherein, above a mid-line of the body, opposite the bottom, are included one or more holes, wherein the inlet is coupled to a removable cover, wherein the neck is tubular-shaped and includes a bend, and wherein the body has an exterior surface shaped to mate with an internal cavity of poultry, the body extending longitudinally wider than laterally, the device further comprising one or more venting ports in the body.

12. The device of claim 11, wherein the body and the neck are fully comprised of ceramic material.

13. The device of claim 12, wherein the exterior surface is glazed, and wherein the neck and the body are a unitary one-piece structure inseparable from one another.

14. A device to be inserted into poultry for cooking, comprising:
a body that has a top and a bottom that are both narrower longitudinally and laterally with respect to a mid-region, the body defining an internal cavity, the body having an overall exterior surface shaped to mate with an internal cavity wall of the poultry, the body extending longitudinally wider than laterally, the body having two or more longitudinally extending rails or longitudinally extending bumps formed on the bottom of the body, the two or more longitudinally extending rails or bumps supporting the device when sitting on a flat surface.

15. The device of claim 14, further comprising:
a neck fluidically coupled with the internal cavity, the neck extending out from the body and vertically upward and shaped to operate as a handle during insertion of the device into the poultry, the neck open at a top end, the opening vertically higher than every portion of an opening at an intersection with the body, the neck having a curve upward, the curve shaped and positioned to engage folded legs of the poultry when inserted into the poultry; and
a projection extending from the body and/or the neck downward and shaped to stabilize the device on the flat surface when not in the poultry.

* * * * *